(12) United States Patent
Schauer et al.

(10) Patent No.: US 7,639,622 B2
(45) Date of Patent: Dec. 29, 2009

(54) COMMUNICATIONS SYSTEM FOR MONITORING A MODEM

(75) Inventors: Paul E. Schauer, Highlands Ranch, CO (US); Pak Siripunkaw, Sicklerville, NJ (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 572 days.

(21) Appl. No.: 11/485,234

(22) Filed: Jul. 12, 2006

(65) Prior Publication Data

US 2007/0014310 A1 Jan. 18, 2007

Related U.S. Application Data

(60) Provisional application No. 60/699,834, filed on Jul. 14, 2005.

(51) Int. Cl.
*H04L 12/26* (2006.01)
(52) U.S. Cl. .................................................... 370/241
(58) Field of Classification Search ................. 370/241, 370/242–246, 252; 714/100, 1, 25, 37, 46; 725/105–107, 111
See application file for complete search history.

(56) References Cited

U.S. PATENT DOCUMENTS

| | | | |
|---|---|---|---|
| 5,774,377 A * | 6/1998 | Eidson et al. | 702/187 |
| 6,289,514 B1 * | 9/2001 | Link et al. | 725/14 |
| 6,588,016 B1 * | 7/2003 | Chen et al. | 725/111 |
| 6,606,298 B1 * | 8/2003 | Foltak | 370/216 |
| 6,782,884 B1 | 8/2004 | Chen et al. | |
| 6,973,668 B1 | 12/2005 | Chen et al. | |
| 6,993,790 B2 * | 1/2006 | Godwin et al. | 726/4 |

* cited by examiner

*Primary Examiner*—Dmitry H Levitan
(74) *Attorney, Agent, or Firm*—Banner & Witcoff, Ltd.

(57) ABSTRACT

A communications system and method for monitoring modems on a communications network includes at least one modem that is configured to have at least a first and a second state. A media protocol device is also included that is configured to determine whether the modem is in the first state or the second state. The media protocol device also has a memory for storing the state of the modem. The media protocol device monitors whether the modem is toggling between the first and the second state and provides a flag when the a number of the toggles between the first and the second states is greater than a predetermined registration threshold.

23 Claims, 3 Drawing Sheets

| COUNTER | TIMESTAMP | CHATTER LIST |
|---|---|---|
| 1 | 00:10 | |
| 2 | 00:12 | |
| 3 | 00:15 | |
| 4 | 00:21 | |
| 5 | 00:26 | MODEM A 00:26 |
| 6 | 00:32 | |
| 7 | 00:40 | |
| 0 | 04:00 | MODEM A REMOVED FROM CHATTER LIST |
| 1 | 05:16 | |

| CHATTER LIST ||
|---|---|
| MODEM IDENTIFIER | TIMESTAMP |
| MODEM A | 00:54 |
| MODEM B | 00:54 |
| MODEM D | 00:54 |
| MODEM R | 00:54 |
| MODEM X | 00:54 |
| MODEM C | 01:05 |
| MODEM L | 01:05 |
| MODEM V | 01:05 |
| MODEM G | 01:31 |
| MODEM N | 01:31 |
| MODEM T | 01:31 |

PREDETERMINED REGISTRATION THRESHOLD: 10,
PREDETERMINED TOGGLE PERIOD: 1 HOUR,
PREDETERMINED TIME INTERVAL: 3 HOURS

FIG. 4

COMMUNICATIONS SYSTEM FOR MONITORING A MODEM

CROSS-REFERENCE TO RELATED APPLICATIONS

This application claims the benefit of U.S. provisional application Ser. No. 60/699,834 filed Jul. 14, 2005.

TECHNICAL FIELD

The present invention relates generally to a system and method for monitoring a modem and more particularly to system and method for monitoring a plurality of modems on a network.

BACKGROUND

Since the advent of the Internet and widespread availability of cable television services, communications systems having modems experience increased usage in businesses and residences alike. It is well known, however, that some modems transition between operating states as a result of problems with the modem or the network to which the modem is connected. As such, to mitigate undesired network anomalies, it is desirable to monitor the communications system (particularly, modems connected thereto) and efficiently provide related information to system operators. Conventional communications systems are inefficient and inept at providing such information. For example, most communications systems merely track the state of a modem without providing information that allows for the quick identification of network problems.

Accordingly, the present invention was conceived in view of these and other disadvantages of conventional communications systems.

SUMMARY

The present invention provides a communications system and method for monitoring modems on a communications network. The communications system includes at least one modem that is configured to have at least a first and a second state. A media protocol device is also included that is configured to determine whether the modem is in the first state or the second state. The media protocol device also has a memory for storing the state of the modem. The media protocol device monitors whether the modem is toggling between the first and the second state and provides a flag when a number of toggles between the first and the second states is greater than a predetermined registration threshold.

The communications system method is a method for monitoring a modem that is configured to have at least a first and a second state. The method also includes determining, through the use of the media and protocol device, whether the modem is in the first state or the second state. The method further includes determining whether a number of toggles, by the modem, between the first state and the second state is greater than a predetermined registration threshold. Another step includes providing an indication of the modem when the toggling between the first and the second states is greater than a predetermined registration threshold.

BRIEF DESCRIPTION OF THE DRAWINGS

The features of the present invention which are believed to be novel are set forth with particularity in the appended claims. The present invention, both as to its organization and manner of operation, together with further objects and advantages thereof, may be best understood with reference to the following description, taken in connection with the accompanying drawings in which:

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art to variously employ in the present invention.

Figure 1:
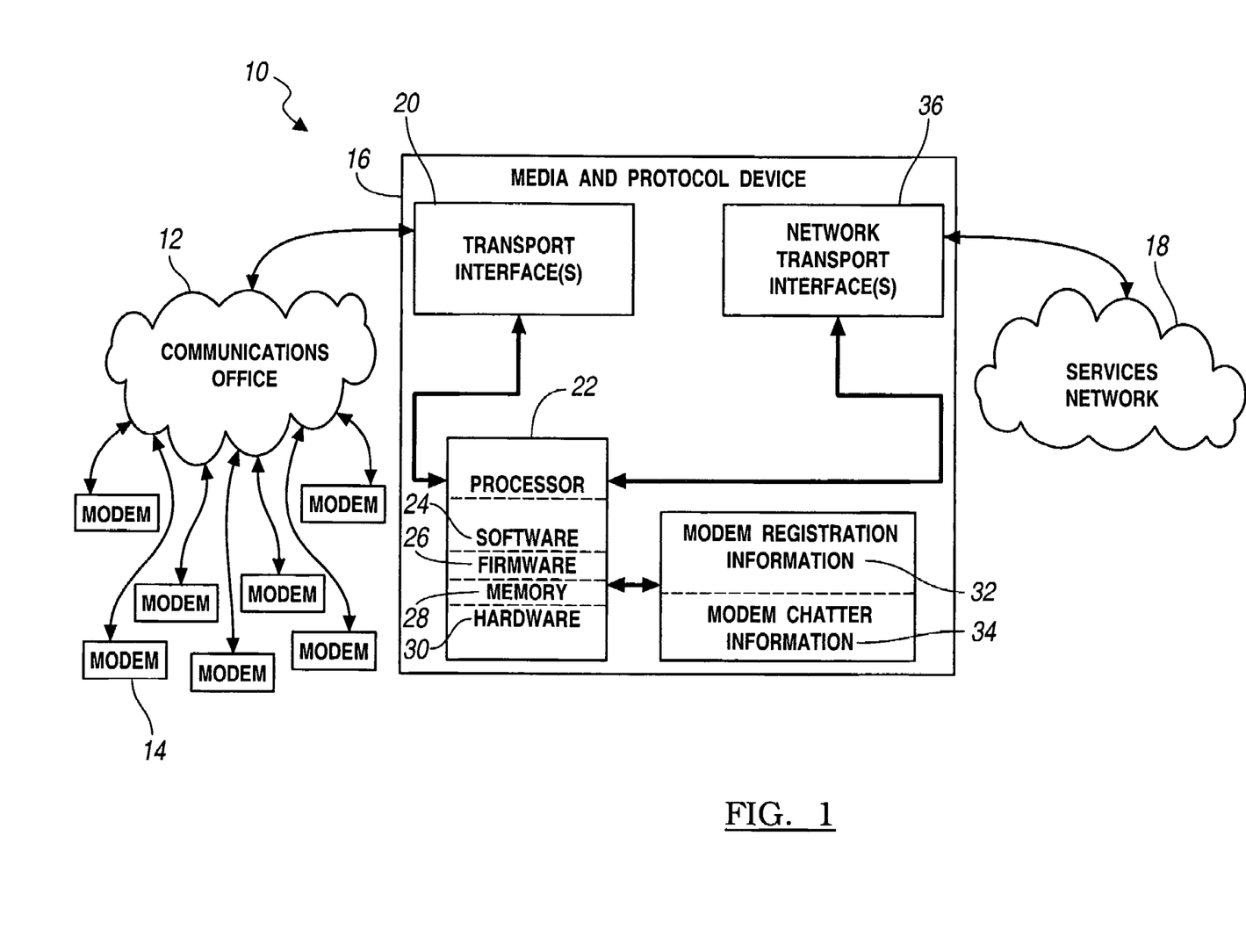
FIG. 1 illustrates a communications system diagram in accordance with an embodiment of the present invention.

Referring to FIG. 1, a communications system 10 is provided that is configured to provide user communications services made available through services network 18. These communications services include, but are not limited to, video services, voice services, data services, and the like. Accordingly, the services network 18 may be embodied as virtually any network that enables the delivery of video, voice, and/or data communications services. In some embodiments, the services network 18 may be a circuit switched network or a packet switched network implemented in the form of a copper wire based network, a fiber based network or a hybrid fiber coaxial network.

The communications system 10 is also capable of monitoring a network of devices and providing related information to a communications office 12 in an efficient manner. The communications office 12 may be an operations center for system operators to receive device information and control the operations of the communications system 10. In one embodiment, the communications office 12 may be a facilities plant for providing the video, voice or data communications services.

A user through the use of a modem(s) 14 may receive and utilize the services made available by the services network 18. As recognized by one of ordinary skill, the modem 14 may be, for example, a discrete cable modem or a digital subscriber line (DSL) modem. The modem 14 may also be integrated with a set-top cable box, or a computer.

Additionally, the modem 14 is configured to have at least two operating states. These states include a registered state and an unregistered state. When the modem 14 is in a registered state, the modem has registered with a media and protocol device 16 and is considered online. The registered state may also include a registration complete state as defined by the data over cable service interface specification (DOCSIS). Alternatively, when the modem is in an unregistered state, the modem is considered offline and/or unable to provide the user services. It is recognized that in some cases, the modem 14 may experience an undesired number of transitions between the registered and unregistered states. These state transitions, which may be referred to as "chattering," inhibit the delivery of consistent communications services. As such, the communications system 10 is capable of identifying chattering modems on the network and providing a table or list (hereinafter referred to as a "chatter list") containing the identified modems.

Regarding the media and protocol device 16, it is capable of receiving, processing, and generating signals and data from the modem 14, the communications office 12, and the services network 18. In one embodiment, the media and protocol device 16 may be located at a head-end of the communications office 12. In such an embodiment, the media and protocol device 16 may be a cable modem termination system (CMTS). Alternatively, it is recognized that the media and protocol device 16 may be embodied as a digital subscriber line access multiplexer (DSLAM).

Accordingly, the media and protocol device 16 is capable of receiving the communications services available through the services network 18 via a network transport interface 36. The network transport interface 36 is adapted to convert, if necessary, the data received via the services network 18 so as to enable a processor 22 to process the data for receipt by the communications office 12 and the modem 14. The processor 22 as shown also includes software 24, firmware 26, a memory 28, and additional hardware 30 for processing of received data and/or signals.

The media and protocol device 16 may have stored in the memory 28, modem registration information 32 and/or modem chatter information 34. The modem registration information 32 includes data pertaining to the state of the modems 14 including, but not limited to, the registration state. The modem chatter information 34 may include information that pertains to the requirements for a modem to be added to a chatter list. As described above in some instances, the modem 14 may toggle between the registered state and the unregistered state. In some cases, such toggling is an indication of problems with the communications system 10 including, the media and protocol device 16 and the communications office 12. Accordingly, the communications system 10, via the media protocol device 16, is configured to monitor the state of the modem 14 and provide the communications office 12 an indication or notification (also referred to as a "flag") pertaining to the particular modem that is toggling.

In one embodiment, the processor 22 within the media and protocol device 16 includes a counter for tracking the number of times a modem 14 registers. Accordingly, the counter is adjusted or incremented each time the modem 14 registers with the media and protocol device 16. In one embodiment, the counter may adjust when the modem reaches a data over cable service interface specification (DOCSIS) registration complete state. It is recognized, however, that other specifications may be utilized in determining whether the modem 14 has registered. Additionally, upon adjustment of the counter, a registration time stamp may be stored within the memory 28 of the processor 22 so as to assist in tracking the number of registrations within a predetermined period of time (hereinafter referred to as a predetermined toggle period). It is recognized, that the predetermined toggle period may be virtually any time period and may vary in accordance with desired monitoring features without departing from the scope of the present invention.

As described above, the media and protocol device 16 contains a counter that increments upon the registration of modems (e.g., modem(s) 14) on the network. In some embodiments, at the time of each registration, the timestamp entry occurs in the memory 28 of the processor 22. If the number of modem registrations exceeds a predetermined registration threshold within the predetermined toggle period, the media and protocol device 16 identifies that particular modem as chattering. The media and protocol device 16 will then place that modem on the chatter list, which is provided to the communications office 12 via the transport interface 20. The transport interface 20, which forwards the signals and/or data to the communications office 12, may be a radio-frequency (RF) type interface. In other embodiments, the transport interface 20 may be a twisted pair type interface.

In some instances, a modem that was previously chattering stops chattering. In such a case, the media and protocol device 16 is adapted to remove the modem from the chatter list. For example, if a predetermined time interval passes subsequent to the modem 14 being added to the chatter list, the counter and timestamp may be cleared or deleted. In such a case, the counter may be decremented to zero while the timestamp is cleared to zero. In one embodiment, the passage of the predetermined time interval may be determined based on a comparison between the previously stored timestamp and a current time. Upon the removal of the modem (e.g., modem 14) from the chatter list, a corresponding electronic notification may be sent to the communications office 12.

The media and protocol device 16 may also provide an alarm notification when the number of chatter list entries falls below a minimum chatter list threshold. Additionally, the alarm notification may be generated when the number of chatter list entries exceeds a maximum number of chatter list entries (hereinafter referred to as a maximum chatter list threshold). The alarm notifications further enable the communications office 12 to ensure optimal communications services for customer having the modem 14.

Figure 2:
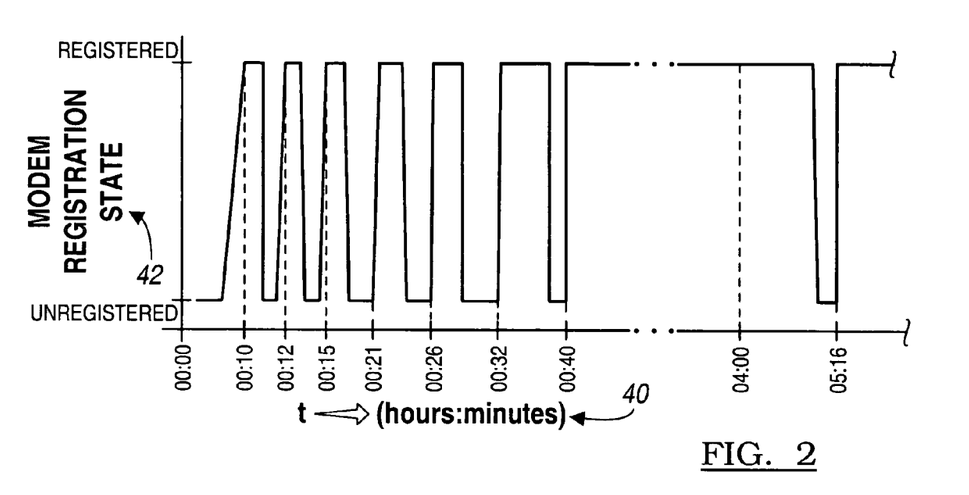
FIG. 2 illustrates a modem state transition chart in accordance with an embodiment of the present invention.
Figure 3:
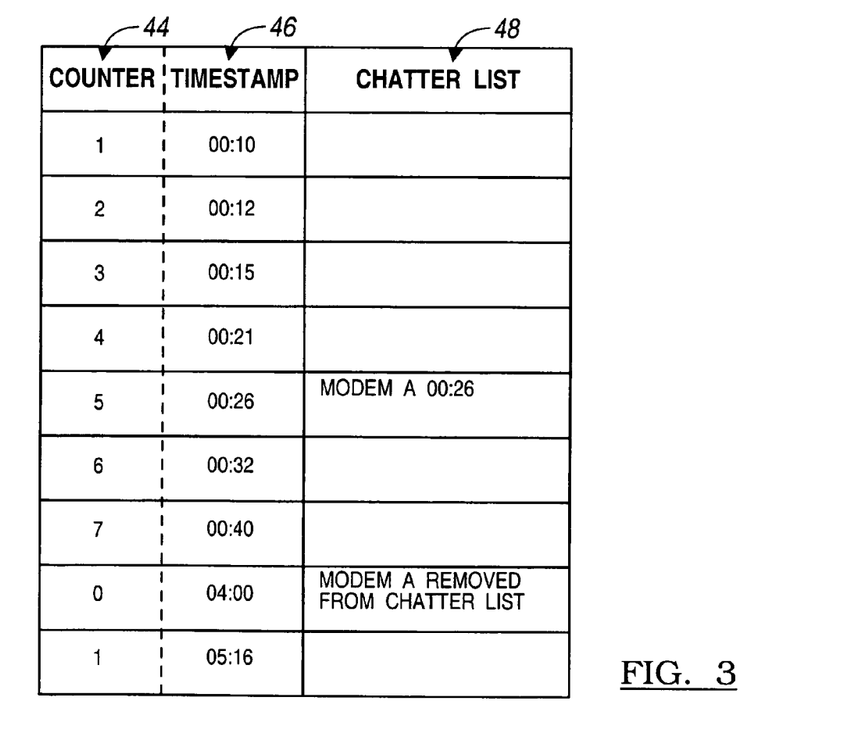
FIG. 3 illustrates a modem counter and chatter list that corresponds with the state transition chart of FIG. 2 in accordance with an embodiment of the present invention.

Now, referring to FIGS. 2 and 3, an exemplary state transition chart is provided along with a table that contains information related to a toggling modem. In this embodiment, the time is measured in hours and minutes, the predetermined registration threshold is five hours, the predetermined toggle period is two hours, and the predetermined time interval is three hours.

Referring specifically to FIG. 2, the chart includes a time axis 40 that intersects a modem registration state axis 42. The table of FIG. 3 includes a counter column 44 that increments each time the modem registers. A timestamp column 46 is included having a timestamp. Additionally, a chatter list 48 contains an identifier for the modem when it is determined that the modem should be added to the chatter list 48.

Particularly, as shown in FIG. 2, at ten minutes, the modem has transitioned from an unregistered state to a registered state. Accordingly, as shown in FIG. 3, the processor has incremented the counter to one and the corresponding time stamp of ten minutes is stored. Subsequent to this first registration, the modem transitions from the registered state to the unregistered state. At about 12 minutes, the modem then transitions again from the unregistered state to the registered state. As such, the counter, as shown in FIG. 3, is incremented and the corresponding registration timestamp is recorded. Subsequent to this second registration, the modem enters the unregistered state.

Following the second registration, the modem then transitions to the unregistered state. At about 15 minutes, the modem transitions from an unregistered state to the registered state. Accordingly, the counter is incremented to three and the corresponding timestamp is stored. Subsequent to the third transition from the unregistered state to the registered state, the modem again enters the unregistered state. At about 21 minutes, the modem transitions from an unregistered state to the registered state. As such, the counter is incremented to four and a corresponding time stamp of 21 minutes is captured. As illustrated by FIG. 2, the modem then transitions again from the registered state to the unregistered state. At 26 minutes, the modem transitions from the unregistered state to the registered state. The counter is accordingly incremented to five and a time stamp of 26 minutes to stored.

As described above, for this example, the predetermined registration threshold is five and the predetermined toggle period is two hours. As such, subsequent to the transition from the unregistered state to the registered state (i.e., the fifth registration) at 26 minutes, the modem is added to the chatter list. As shown, the modem identifier, which may include an indication of the type/name of the modem in combination with the time stamp, are added to the chatter list. Once the modem information is added to the chatter list, a notification or flag may be provided to a system operator in the form of an electronic communication. The media and protocol device 16 (FIG. 1) continues to monitor the modem even after the addition of the modem to the chatter list. Additionally, the modem chatter list may also include other information pertinent to the modem(s) being added to the chatter list. For example, the chatter list may include information such as upstream channel information, port information, longitude/latitude information, a billing code, a common language location code (CLLC), and/or a zip code, which pertains to the modem that was added to the chatter list.

Now, referring back to FIG. 2, subsequent to the modem being added to the chatter list, the modem again transitions from the registered state to the unregistered state. At 32 minutes, the modem then transitions from the unregistered state to the registered state, which causes the counter to be incremented to six and the timestamp of "00:32" to be stored (see FIG. 3). As shown, the modem again toggles from the registered state to the unregistered state at approximately 38 minutes. Subsequently, the modem enters the registered state at 40 minutes and maintains this registered state for a time period greater than the predetermined time interval. In this example the registered state is maintained for over 3 hours, which is greater than the predetermined time interval. Accordingly, upon passing of the predetermined time interval, the modem is removed from the chatter list and the counter is cleared or reset to zero. Once the modem is removed from the chatter list, an electronic notification may be generated and sent to the system operator or the communications office 12 (FIG. 1).

Figure 4:
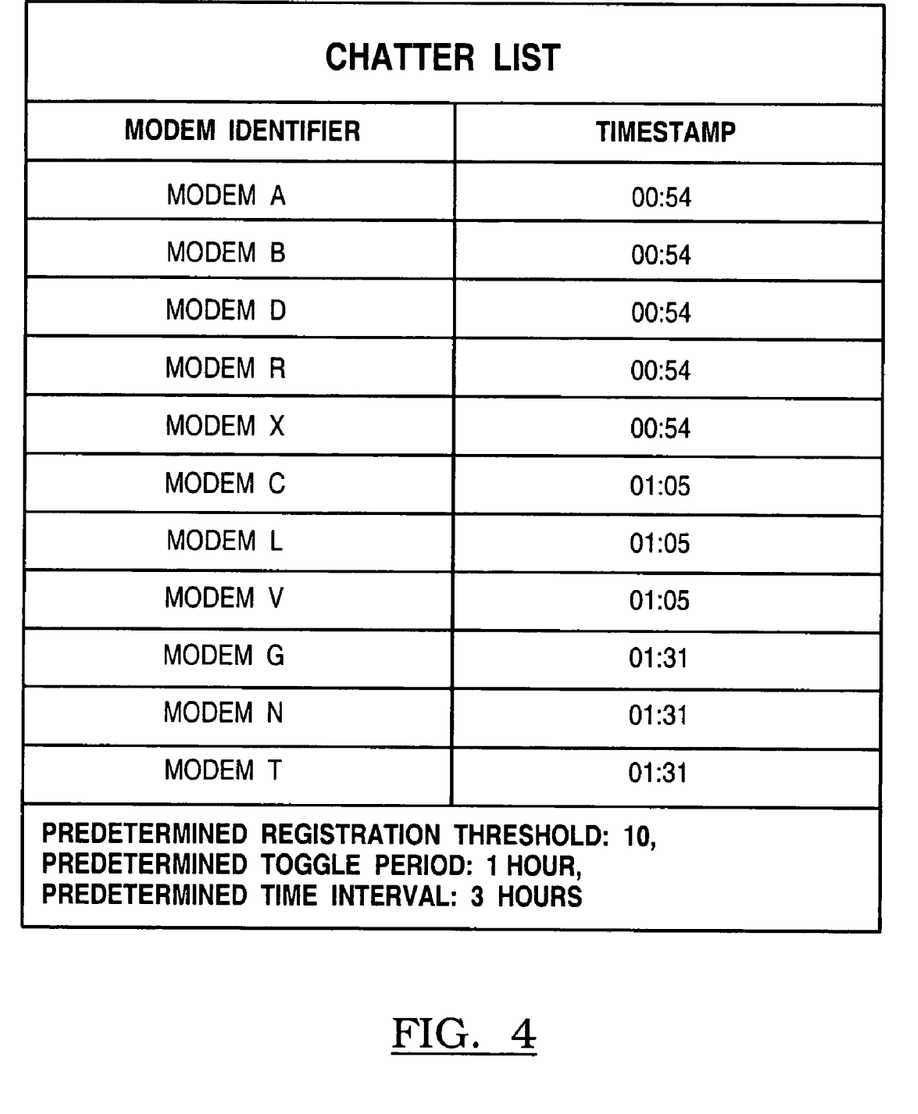
FIG. 4 illustrates a modem chatter list in accordance with yet another embodiment of the present invention.

Now, referring to FIG. 4, a chatter list is shown wherein a plurality of modems (e.g., modems A, B, D, R, X, C, L, V, G, N, and T) is monitored. In this example, the predetermined registration threshold may be ten, the predetermined toggle period is one hour, and the predetermined time interval is three hours. In this embodiment, the media and protocol device has determined that the modems A, B, D, R, X, C, L, V, G, N, and T have exceeded the predetermined registration threshold of ten within the predetermined toggle period of one hour. Accordingly, modems A, B, D, R, and X were added to the chatter list at 54 minutes. Modems C, L, and V were added to the chatter list at one hour and five minutes. Additionally, modems G, N, and T were added to the chatter list after one hour and 31 seconds. Because the number of modems has exceeded a maximum chatter list threshold (e.g., 8 modems), an alarm notification (or flag) is sent to the system operator. However, upon the passing of the predetermined time interval of three hours, the modems added to the chatter list may be removed. For example, assuming modems A, B, D, R, and X maintained the registered state for at least three hours, they will be removed from the chatter list. Accordingly, modems C, L, V, G, N, and T may also be removed provided they maintain the registered state for at least the predetermined time interval (e.g., three hours). In the event that the modems listed on the chatter list are removed, an alarm notification may be generated if the chatter list includes a number of modem entries that is less than a minimum chatter list threshold. In one aspect of the invention, the minimum chatter list threshold may be 2.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A communications system comprising:
 a modem configured to have at least a first and a second state; and
 a media and protocol device configured to monitor the modem state and determine whether the modem is toggling between the first state and the second state and providing a flag when a number of toggles between the first and the second states is equal to or greater than a predetermined registration threshold, and wherein
 the media and protocol device includes (a) a counter that adjusts upon the modem toggles between the first and the second state and (b) a timestamp that is updated when the modem toggles between the first and the second state, and
 the counter is cleared upon the passing of a predetermined time interval, wherein the passing of a predetermined time interval is determined based upon a comparison of the timestamp with a current time.

2. The communications system of claim 1, wherein the first state is an unregistered state and the second state is a registered state.

3. The communications system of claim 1, wherein each updated timestamp is maintained in a memory of the media and protocol device.

4. The communications system of claim 3, wherein each timestamp is cleared upon the passing of the predetermined time interval.

5. The communications system of claim 1, wherein the counter adjusts upon the modem reaching a data over cable service interface specification (DOCSIS) registration complete state.

6. The communications system of claim 1, wherein providing the flag includes generating a modem chatter list having an identifier of the modem.

7. The communications system of claim 6, wherein the media and protocol device provides the flag when the number of modem toggles equal to or greater than the predetermined registration threshold occurs within a predetermined toggle period.

8. The communications system of claim 6, wherein the modem chatter list includes at least one of an upstream channel information, port information, a longitude/latitude information, a billing code, a common language location code, and a zip code.

9. The communications system of claim 1, wherein the media and protocol device includes a cable modem termination system (CMTS).

10. The communications system of claim 1, wherein the modem includes a cable modem.

11. A communications system comprising:
 a modem configured to have at least a first and a second state; and a media and protocol device configured to monitor the modem state and determine whether the modem is toggling between the first state and the second state and providing a flag when a number of toggles between the first and the second states is equal to or greater than a predetermined registration threshold, and wherein providing the flag includes generating a modem chatter list having an identifier of the modem, and the media and protocol device adapted to generate an alarm notification upon the modem chatter list having a number of modem entries that is less than a minimum chatter list threshold or the number of entries is greater than a maximum chatter list threshold.

12. The communications system of claim 11, wherein the media and protocol device includes (a) a counter that adjusts upon the modem toggles between the first and the second state and (b) a timestamp that is updated when the modem toggles between the first and the second state.

13. The communications system of claim 12, wherein the counter is cleared upon the passing of a predetermined time interval, wherein the passing of the predetermined time interval is determined based upon a comparison of the timestamp with a current time.

14. A method of monitoring a modem configured to have at least a first and a second state, the method comprising:

determining whether the modem is toggling between the first state and the second state;

counting the modem toggles and providing a timestamp for each modem toggle;

maintaining each timestamp in a memory of the media and protocol device;

determining whether a number of modem toggles between the first state and the second state is greater than a predetermined registration threshold;

providing a flag when the number of modem toggles is equal to or greater than the predetermined registration threshold; and clearing the modem toggle count upon passing a predetermined time interval, the passing of the predetermined time interval being determined based upon a comparison of the timestamp with a current time.

15. The method of claim 14, wherein the providing of the flag includes generating a modem chaffer list having an identifier of the modem.

16. The method of claim 14, wherein the providing of the flag occurs when the number of toggles between the first and the second states that is equal to or greater than the predetermined registration threshold occurs within a predetermined toggle period.

17. A method of monitoring a modem configured to have at least a first and a second state, the method comprising:

determining whether the modem is toggling between the first state and the second state;

determining whether a number of modem toggles between the first state and the second state is greater than a predetermined registration threshold;

providing a flag when the number of modem toggles is equal to or greater than the predetermined threshold, wherein the providing of the flag includes generating a modem chatter list having an identifier of the modem; and generating an alarm notification upon the modem chatter list having a number of modem entries that is less than a predetermined alarm threshold.

18. The method of claim 17, further comprising counting the modem toggles and providing a timestamp for each modem toggle.

19. The method of claim 18, further comprising maintaining each timestamp in a memory of the media and protocol device.

20. The method of claim 19, wherein each timestamp is cleared upon the passing of a predetermined time interval.

21. The method of claim 19, further comprising clearing the counter upon passing a predetermined time interval, the passing of the predetermined time interval being determined based upon a comparison of the timestamp with a current time.

22. An apparatus, comprising:

a transport interface, and a processor configured to communicate with the transport interface, wherein the apparatus is configured to perform steps that include determining whether a modem is toggling between a first state and a second state, counting the modem toggles and providing a timestamp for each modem toggle, maintaining each timestamp in a memory of the apparatus, determining whether a number of modem toggles between the first state and the second state is greater than a predetermined registration threshold, providing a flag when the number of modem toggles is equal to or greater than the predetermined registration threshold, and clearing the modem toggle count upon passing a predetermined time interval, the predetermined time interval being determined based upon a comparison of the timestamp with a current time.

23. An apparatus, comprising:

a transport interface, and a processor configured to communicate with the transport interface, wherein the apparatus is configured to perform steps that include determining whether a modem is toggling between a first state and a second state, determining whether a number of modem toggles between the first state and the second state is greater than a predetermined registration threshold, providing a flag when the number of modem toggles is equal to or greater than the predetermined registration threshold, wherein the providing of the flag includes generating a modem chatter list having an identifier of the modem, and generating an alarm notification upon the modem chatter list having a number of modem entries that is less than a predetermined alarm threshold.

* * * * *

UNITED STATES PATENT AND TRADEMARK OFFICE
CERTIFICATE OF CORRECTION

PATENT NO. : 7,639,622 B2  Page 1 of 1
APPLICATION NO. : 11/485234
DATED : December 29, 2009
INVENTOR(S) : Schauer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 742 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,639,622 B2 | Page 1 of 1 |
| APPLICATION NO. | : 11/485234 | |
| DATED | : December 29, 2009 | |
| INVENTOR(S) | : Paul E. Schauer et al. | |

It is certified that error appears in the above-identified patent and that said Letters Patent is hereby corrected as shown below:

In Column 6, Claim 8, Line 56:
    Please replace "chaffer" with --chatter--

In Column 7, Claim 15, Line 44:
    Please replace "chaffer" with --chatter--

Signed and Sealed this

Twentieth Day of December, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,639,622 B2 | Page 1 of 1 |
| APPLICATION NO. | : 11/485234 | |
| DATED | : December 29, 2009 | |
| INVENTOR(S) | : Paul E. Schauer et al. | |

It is certified that error appears in the above-identified patent and that said Letters Patent is hereby corrected as shown below:

In Column 7, Claim 14, Line 31:
    Please replace "the media" with --a media--

In Column 8, Claim 19, Line 11:
    Please replace "the media" with --a media--

Signed and Sealed this
Third Day of July, 2012

David J. Kappos
*Director of the United States Patent and Trademark Office*